United States Patent [19]

Caroselli

[11] Patent Number: 4,821,935
[45] Date of Patent: Apr. 18, 1989

[54] THREADING APPARATUS FOR FILMS

[75] Inventor: Hellmut Caroselli, Wiesbaden, Fed. Rep. of Germany

[73] Assignee: Hoechst Aktiengesellschaft, Frankfurt am Main, Fed. Rep. of Germany

[21] Appl. No.: 924,533

[22] Filed: Oct. 29, 1986

[30] Foreign Application Priority Data

Nov. 8, 1985 [DE] Fed. Rep. of Germany ....... 3539591

[51] Int. Cl.$^4$ .................. B29D 7/01; B65H 59/10; B65H 59/20
[52] U.S. Cl. .......................................... 226/92; 226/91
[58] Field of Search ............... 226/91, 92, 176, 181, 226/183, 186, 89, 90

[56] References Cited

U.S. PATENT DOCUMENTS

| | | | |
|---|---|---|---|
| 3,246,818 | 4/1966 | Davis | 226/90 |
| 3,296,713 | 1/1967 | Larsen et al. | 226/90 X |
| 3,703,980 | 11/1972 | Bright | 226/90 |
| 3,999,696 | 12/1976 | Reba et al. | 226/7 |
| 4,014,487 | 5/1977 | Reba et al. | 226/5 |
| 4,186,860 | 3/1980 | Reba | 226/91 |
| 4,610,097 | 9/1986 | Kotitschke et al. | 34/117 |
| 4,648,942 | 3/1987 | Wanke et al. | 226/92 X |

FOREIGN PATENT DOCUMENTS 1163006 2/1964 Fed. Rep. of Germany ........ 226/92

Primary Examiner—Donald Watkins
Attorney, Agent, or Firm—Gregory N. Clements

[57] ABSTRACT

An improved apparatus for threading thermoplastic film through at least one forward stretching machine 23, comprising driven, stationary rolls 1 and driven, raised lift rolls 2. Each of the rolls 1 and 2 has an intake plate 4 on one of its front sides, which has a milled grooved 24 for the threading apparatus to pass through. The threading apparatus comprises a flexible rod 18 with a removably attached clamp component 13 or 25. The clamp components contain variously configured clamping elements, springs, and insertion slots. The clamping elements are arranged in such a way that they hold the film web 3, which has been inserted in them, during the transport of the threading unit through the forward stretching machine, this holding being done by means of self-locking or spring-loading. For the reliable introduction of the threading apparatus into the forward stretching machine 23, there is disclosed an insertion unit 31, having pairs of upper and lower guide bearings 19. The insertion unit 31 comprises a movable rod support 20, which makes it possible to lower the inserted rod 18 onto the rotating lower rolls 1, which then grip the rod and transport it through the threading channel, which is formed by the milled grooves 24 on the intake place 4 of all rolls 1 and 2.

4 Claims, 6 Drawing Sheets

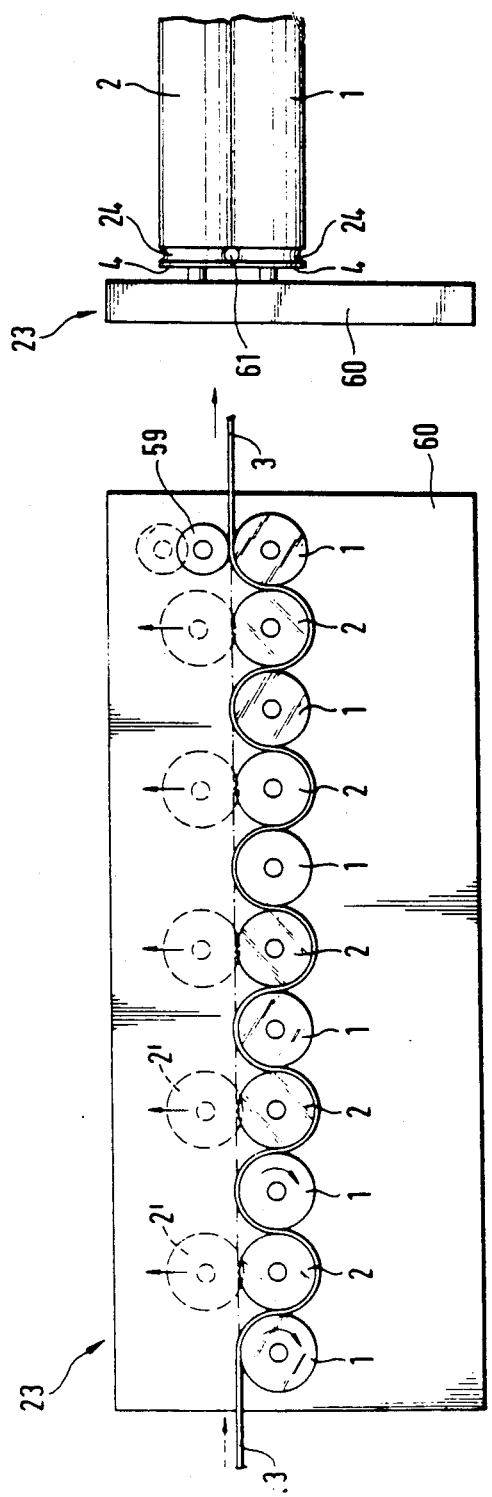

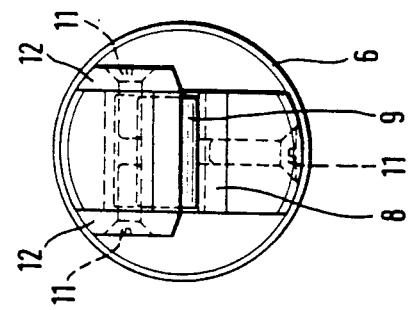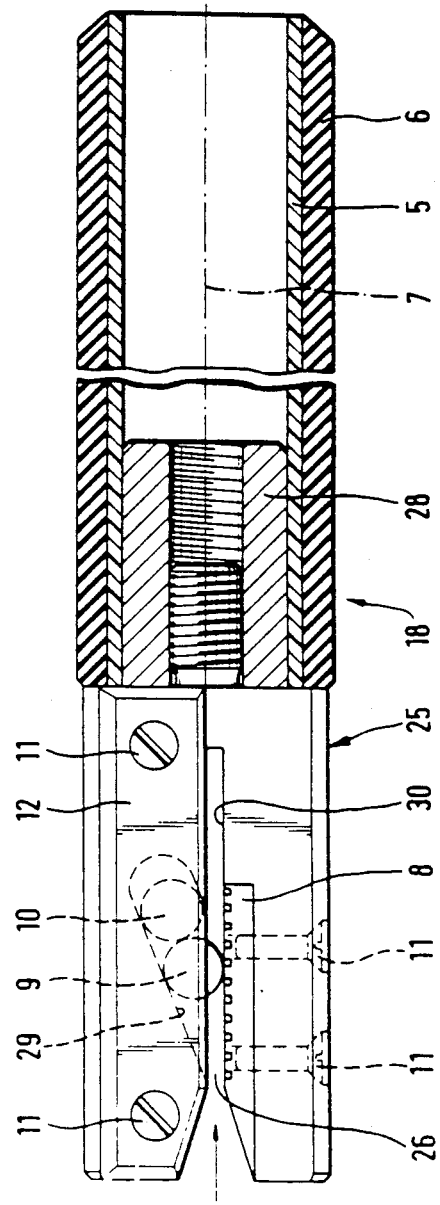

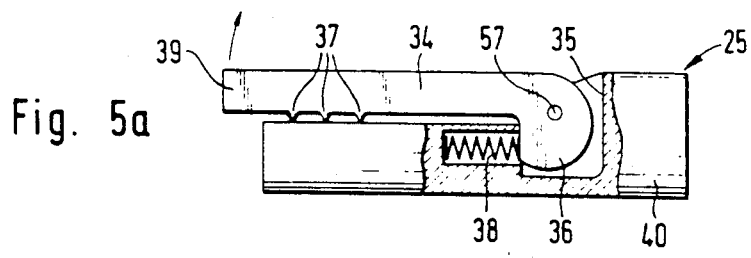
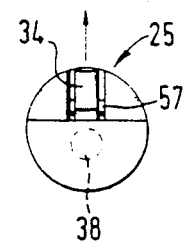
Fig. 5a
Fig. 5d
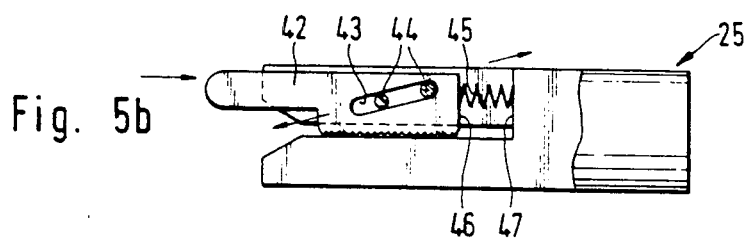
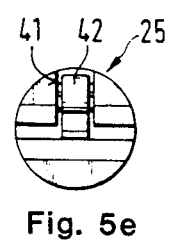
Fig. 5b
Fig. 5e
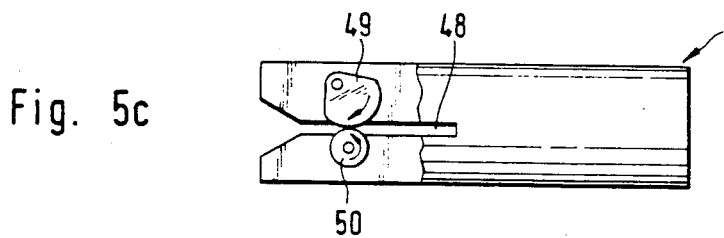
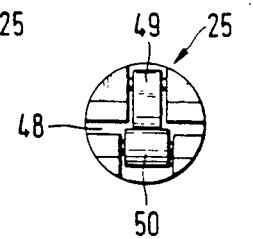
Fig. 5c
Fig. 5f

THREADING APPARATUS FOR FILMS

BACKGROUND OF THE INVENTION

The present invention relates to a threading apparatus for films which are to be transported through at least one forward stretching machine for films, consisting of driven stationary rolls and driven, raised lift rolls, while the rolls are rotating.

The increased requirements for profitability of film manufacturing lines in which a raw film is oriented in the machine and transverse directions require constantly increasing operating speeds, wider web widths, and absolute cleanliness within the film manufacturing line. Threading the film web through the forward stretching machine is necessary after production is interrupted, when the line is started up, after tears in the web, after a roll change, after changes in production speed, etc. Units to thread films through the forward stretching machine of a film manufacturing machine by means of lines revolving parallel to the front side of the roll are known, as are chains in place of the parallel lines, which transport the threading apparatus through the film forward stretching machine. For narrower film web widths, it is also possible to manually thread the film web while the rolls are standing still.

Previously known mechanical threading units are, in general, suitable only for film web speeds up to 100 m/min. At higher speeds their rate of shutdowns and contamination increases and they become a hazard for the operating personnel. A further disadvantage is the expense of constructing something on the order of rotating lines or chains on both sides of the rolls, which transport the clips which hold the film web as it passes through the film stretching machine.

The Airlift ® system transfers paper webs or sheets between certain sections of a papermaking machine by means of a high flow air current acting in cooperating relationship with a paper guide. See U.S. Pat. Nos. 3,999,696; 4,014,487; and 4,186,860.

The objects of this invention are to improve a film web threading apparatus in such a way that it is suitable for web speeds up to 250 m/min with minimal construction expenditure, operates with as little interruption and contamination as possible, and provides the operators with maximum security against accidents.

BRIEF DESCRIPTION OF THE DRAWINGS

FIG. 1a is a schematic side view of a forward stretching machine for films.

FIG. 1b is a view of a side support of the forward stretching machine and of two rolls mounted on the side support.

FIG. 2a is a cross-section of a film threading apparatus according to the invention.

FIG. 2b is an end view of the film threading apparatus in FIG. 2a.

FIG. 3b is a top view of the clamp component of the film threading apparatus depicted in FIG. 3a.

FIG. 3c is an end view of the clamp component of the film threading apparatus in FIG. 3a.

FIGS. 5a–5c are schematic drawings of clamp components of the film threading apparatus according to the invention, suitable for relatively thick films.

FIGS. 5d–5f are end views of the clamp components depicted in FIGS. 5a–5c, respectively.

SUMMARY OF THE INVENTION

Figure 3C:
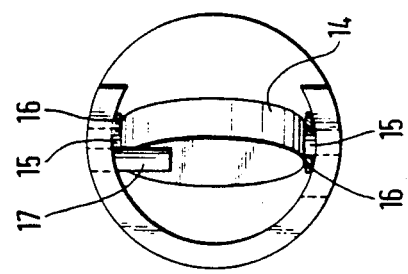

In one aspect, the present invention is an apparatus for the rapid and automatic threading of a forward stretching machine for thermoplastic films comprising:
 (a) means for releasably clamping a thermoplastic film;
 (b) a flexible cylinder having the same outside diameter as, and a length at least ten times greater than, said means for releasably clamping a thermoplastic film;
 (c) means for releasably attaching said flexible cylinder to said means for releasably clamping a thermoplastic film in an end-to-end manner, such that said flexible cylinder and the clamping means have a common longitudinal axis.

In another aspect, the present invention is an improved forward stretching machine for the manufacture of oriented thermoplastic films comprising a plurality of individually driven, rotably mounted rolls in cooperating relationship, such that each alternate roll is a stationary roll and every other roll is a lift roll capable of being raised a distance slightly less than the diameter of the rolls, with the proviso that each stationary and lift roll has a groove located on the end of the roll adapted to receive a cylindrical film threading apparatus, such that the grooves of adjacent stationary and lift rolls form a channel through which said cylindrical film threading apparatus can pass when the lift rolls are in the raised position.

Yet another aspect of the present invention is a process for the rapid threading of a forward stretching machine for thermoplastic film comprising
 (i) raising every other roll of said forward stretching machine from its production position by a distance slightly less than the roll diameter;
 (ii) clamping a cylindrical threading apparatus onto the film to be threaded; said threading apparatus comprising
  (a) means for releasably clamping a thermoplastic film;
  (b) a flexible cylinder having the same outside diameter as, and a length at least ten times greater than, said means for releasably clamping a thermoplastic film;
  (c) means for releasably attaching said flexible cylinder to said means for releasably clamping a thermoplastic film in an end-to-end manner, such that said flexible cylinder and the clamping means have a common longitudinal axis;
 (iii) inserting said threading apparatus at the inlet of said forward stretching machine, wherein said machine comprises a plurality of individually driven, rotably mounted rolls in cooperating relationship, such that each alternate roll is a stationary roll and every other roll is a lift roll capable of being raised a distance slightly less than the diameter of the rolls, with the proviso that each stationary and lift roll has a groove located on the end of the roll adapted to receive said cylindrical film threading apparatus, such that the grooves of adjacent stationary and lift rolls form a channel through which said cylindrical film threading apparatus can pass when the lift rolls are in the raised position;

(iv) rotating the lift and stationary rolls at the same speed such that said cylindrical threading apparatus is carried through said forward stretching machine, thereby threading said machine with said thermoplastic film;

(v) removing said cylindrical film threading apparatus from the outlet of said forward stretching machine and detaching said cylindrical film threading apparatus from said thermoplastic film.

DETAILED DESCRIPTION OF THE INVENTION

The objects of this invention are achieved by a forward stretching machine in combination with a film threading apparatus as summarized above, in which the front side of each roll in a forward stretching machine is equipped with an indented plate having a groove through which a film threading apparatus can pass. The film threading apparatus comprises a flexible rod with a removable clamp component which includes clamp elements, springs and insertion slits. The clamp elements are made in such a way that they are self-locking or spring-loaded, and should firmly hold the film web fastened in the clamp component during the transport of the threading apparatus through the forward stretching machine.

In the design of the invention the flexible rod is conveniently a plastic tube covered with rubber, into which a threaded piece is fastened; the clamp component is screwed into this threaded piece. In one embodiment of the invention the cylindrical clamp component has a side insertion slot, which widens conically toward the front surface of the clamp component and runs parallel to the longitudinal center line of the rod; a slot, which runs upward at an angle when the rod is in a horizontal position, branches off from the insertion slot. Two rollers are aligned in this slot, which roll along the inclined plane of the slot. When the flexible rod is in a horizontal position the lower roller is pressed against the base of the insertion slot by the force of gravity upon the upper roller.

In the threading apparatus of the present invention, all rolls are rotated as the film is threaded through the forward stretching machine and the lift rolls are raised far enough from the stationary rolls so that the grooves on the intake plates of the lift rolls contact the top side and the grooves on the intake plates of the stationary lower rolls contact the underside of the transport web for the flexible rod in such a way that its forward motion between rolls can be advanced solely by a slight bending of its plastic tube.

The advantages of this invention are that the forward stretching machine is prepared for the insertion or threading of the film web in the shortest possible time, that a blockage of the incoming film web during its insertion in the intake or outlet of the forward draw does not occur, that the threading can take place without changing the production speed, and that a very high threading speed, up to 250 m/min, is possible. Additional advantages are that the threading apparatus is suitable for all current film gauges and no mechanical parts for threading are present inside the forward stretching machine, which makes possible a high degree of cleanliness, almost total freedom from abrasion, and rapid roll change. Furthermore, the danger of accidents is almost zero, since the operator never reaches his hand near the gap between the intake rolls. In contrast to this, when manual threading is performed initially or when rolls are cleaned after a film blockage in the forward stretching machine there is always an increased danger of accidents.

Yet another advantage of the invention is that, if the film web tears within the forward stretching machine, every second roll is set up as a lift roll and can be raised; as a result of this there is easy access to the individual rolls, which avoids damage due to winding of the film web around a single roll due to a split.

The present invention is further described in greater detail below with reference to the drawings.

FIG. 1 depicts forward stretching machine 23 for films with stationary rolls 1 and lift rolls 2, which the film web 3 loops around. The path of film web 3 between rolls 1 and 2 during production is shown by a solid line, while the path of the film web 3 during its threading or transport through the forward stretching machine is shown by a dotted line. Both the stationary rolls 1 and the lift rolls 2 are driven. During production, rolls 1 and 2 are aligned next to each other, whereby the film web 3 always passes over the stationary rolls 1 from above and the lift rolls 2 from below. Nip rolls 59 are also located in the forward stretching machine; only one of these rolls, which during production lie opposite the individual stationary rolls and together with them form a pass-through gap for the film web 3, is shown in FIG. 1a. If the lift rolls 2 are raised, the nip rolls 59 are also raised. The lift rolls' positions during production are shown by solid lines, and their raised positions by dotted lines.

In the threading position for the film web 3, all lift rolls 2, which are looped around from below by the film web 3 as already mentioned, are raised by a predetermined lift distance. The diameter of rolls 1 and 2 are the same and the lift height of the lift rolls 2 is slightly smaller than the roll diameter. For example, the lift height can be equal to the roll diameter minus 2 mm. The speeds of all rolls in the threading position of the forward stretching machine 23 are synchronized, whereby the differences in the speeds of individual rolls are brought to within ±2% of one another. During the production, the speeds of individual roll groups within the forward stretching machine 23 are, as is known, different from one another, since the forward stretching of the film web 3 is due to the increasing rotational speeds of the rolls toward the exit of the forward stretching machine 23. The diameter of the stationary rolls 1 and lift rolls 2 can also be different.

FIG. 1b shows a side view of a side support 60 of the forward stretching machine, as well as parts of a stationary roll 1 and a raised lift roll 2. Both the stationary roll 1 and the lift roll 2 are equipped at least on the front side with an intake plate 4, which has a milled groove 24 for the threading apparatus to pass through. All rolls 1 and 2 of the forward stretching machine are equipped on the front side with an intake plate 4 having a milled groove 24. The intake plates 4 have the same diameter as the rolls.

Figure 4B:
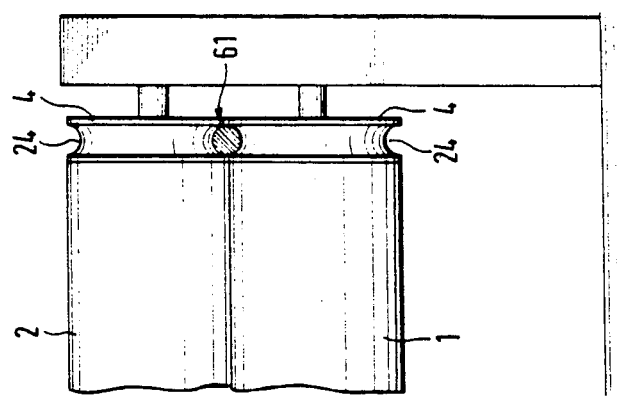
FIG. 4b is a view of a side support of the forward stretching machine and of two rolls mounted on the side support.
Figure 4A:
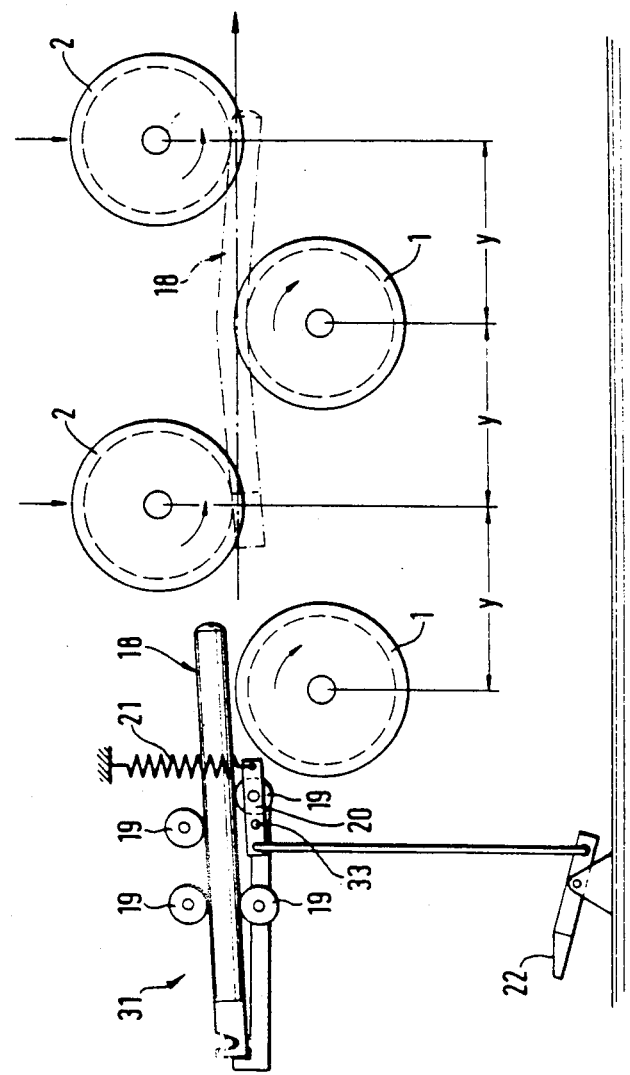
FIG. 4a is a schematic drawing of an insertion unit for the film threading apparatus according to the invention.

From the drawing it can be seen that when the lift roll 2 is raised, the milled grooves 24 of the intake plates 4 form a threading channel 61 for the threading apparatus; this channel 61 is depicted in FIG. 1b as a circular cross-section. In connection with this, however, it must be mentioned that, as shown in FIGS. 4a and 4b, the threading channel 61 in the machine direction is in no way a closed entity, but rather is bounded solely by the milled grooves 24 of the stationary rolls on the bottom and by the milled grooves 24 of the raised lift rolls 2 on the top. Film web 3 is threaded through forward stretching machine 23 by clamping the film web onto the film threading apparatus and transporting the film threading apparatus through threading channel 61, which is formed by the cooperating relationship of the milled grooves 24 of the stationary and lift rolls when the lift rolls are in their raised position.

FIGS. 2a and 2b show views of the threading apparatus, comprising a flexible rod 18 in combination with removable clamp component 25. The rod 18 is a plastic tube 5, covered with rubber 6, in which a threaded section 28 is embedded, into which the clamp component 25 is screwed. The rubber 6 may be either glued to the plastic tube 5 or vulcanized onto it. The threaded section 28 is, for example, glued to the inside wall of the plastic tube 5. The cylindrical clamp component 25 has a side insertion slit 26, which widens conically toward the front surface of the clamp component 25. The insertion slit 26 runs parallel to and below a longitudinal center line 7 of flexible rod 18. The conical expansion of the insertion slit 26 simplifies the feeding of the film web 3 into the clamp component 25. The illustrated construction form of the clamp component 25 is especially suited for thicker films, which can have a film gauge ranging from about 0.15 to 0.80 mm.

A clamp plate 8 with surface knurling forms a part of the base surface 30 of the insertion slit 26 and is fitted into the clamp component 25. Countersunk screws 11 hold the clamp plate 8 firmly. The plastic tube 5 of the rod 18 is about 10 times as long as the clamp component 25. The transport of the threading device through the threading unit is always done in such a way that the rod 18 is fed into the threading channel 61 with the plastic tube in front.

An upward-slanted slot 29 branches off the insertion slit 26, in which slot two rollers 9 and 10 are aligned, which can roll along the inclined plane of slot 29. The lower roller 9 is a plastic roller and the upper roller 10 is a steel roller. In the horizontal position of rod 18, as it is introduced into the threading channel 61, the force of gravity causes the heavier upper steel roller 10 to press the lighter lower plastic roller 9 against the base surface 30 of the insertion slit 26, as a result of which the side edge of the film web 3, which is pushed into the insertion slit 26, is automatically held fast by roller 9. The rollers 9 and 10 can move freely in slot 29, and as soon as the side edge of film web 3 is pushed through the insertion slot 29 rollers 9 and 10 are lifted in the slanted slot 29. Tension on the film web 3 in the direction opposite the rod 18 causes the above-mentioned automatic clamping of the film web 3 by the roller 9. The film web 3 is removed from the clamp component 25 by tension in the direction of the rod 18, as a result of which both rollers, 9 and 10, are raised within the slanted slot 29 and therefore release the film web 3.

Side pieces 12, made of plastic, bound both sides of the slot 29 in the clamp component 25 and are connected to one another by countersunk screws 11.

Figure 3A:
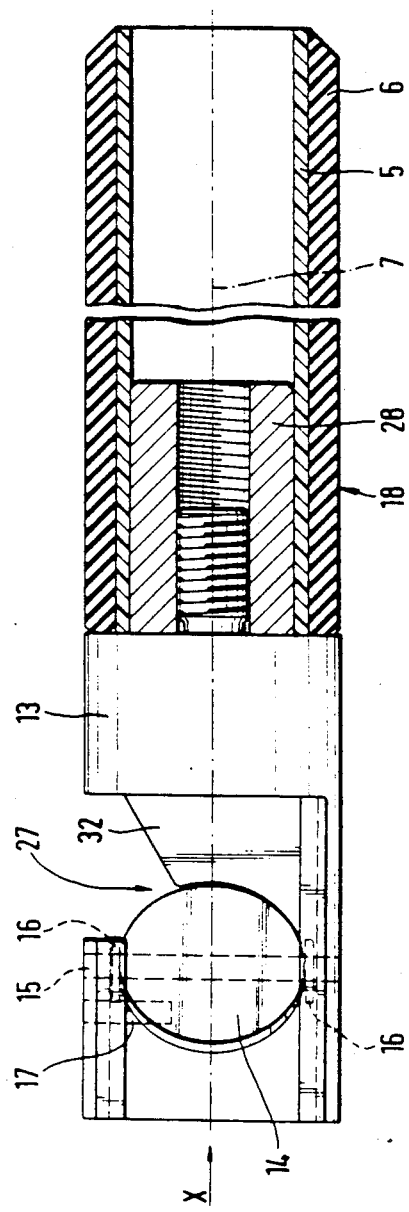
FIG. 3a is a different form of film threading apparatus according to the invention, in cross-section.
Figure 3B:
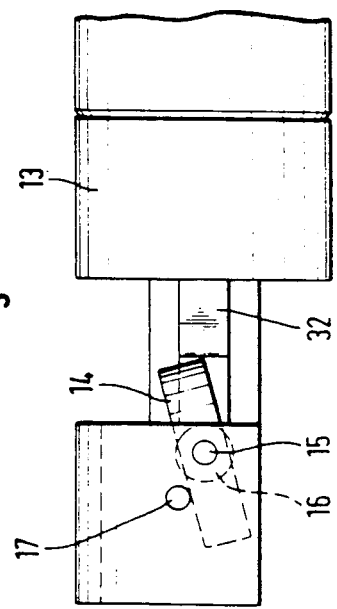

Another embodiment of the threading apparatus is depicted in FIGS. 3a through 3c. The plastic tube 5 with the rubber 6 and the attached threaded section 28 is similar to the plastic tube 5 in the embodiment of the threading apparatus illustrated in FIGS. 2a and 2b. Clamp component 13, which is screwed into the threaded section 28, is different from the clamp component 25 illustrated in FIGS. 2a and 2b in that it is especially well suited for thinner films with a gauge of 150 $\mu$m or less. Clamp component 13 comprises a halved tube with a clamping bar 32 and a clamping disk 14 which can be rotated around a swivel pin 15, which is installed in the wall of the halved tube. The clamping bar 32 has a curve which reflects the circumference of the clamping disk 14. The tube is recessed around the clamping bar 32. As a result of this recessing, it is possible to slightly gather the film web 3 and to clamp it between the clamping bar 32 and the clamping disk 14, since the clamping disk 14 forms a clamping slot down to the base of the tube. When tension is exerted on the film web 3, the clamping disk 14 rotates and causes automatic clamping between the clamping bar 32 and the clamping disk 14. The film web is removed from the automatic clamp between the clamping bar 32 and the clamping disk 14 by tension in the opposite direction on its short end.

The insertion slit 27 for the film web 3 is perpendicular to the longitudinal center line 7 of the rod 18, as can be seen in FIG. 3a. On both sides of the clamping disk 14, a spacing disk 16, rests upon the rotating swivel pin 15 and holds the clamping disk in the center of the tube.

As can be seen from FIG. 3b, there is a stop pin 17 on the side of the clamping disk 14 opposite the clamping bar 32, which limits the rotation of the clamping disk 14, so that the pressure on the film web at the clamping position between the clamping bar 32 and the clamping disk 14 cannot become so great that it causes damage.

FIG. 4a depicts an insertion unit 31 for the threading apparatus. This insertion unit 31, for example, comprises two upper pairs of guide bearings 19, between which the threading apparatus is placed. A rod support 20 is installed in the insertion direction between the lower pairs of guide bearings 19; this support can be rotated around an axle 33. The front end of the rod support 20, in the insertion direction, is connected to a tension spring 21, and the back end is connected by way of a linkage rod to a foot pedal 22 to move the rod support 20 in a horizontal position by pressing the foot pedal downward to pivot the rod support via the linkage rod around the stationary axle 33 in a horizontal position.

On the front side of the forward stretching machine, at which the lift rolls 2 are raised, the threading apparatus is installed in the insertion unit 31, with the clamp component toward the back. After the film web is clamped into the clamp component of the threading apparatus, the foot pedal 22 is pressed and the rod support 20 is lowered. As a result of this, the rod 18 is also lowered and enters the threading channel 61, illustrated in FIG. 4b, which is formed by the milled grooves 24 of the intake plates 4 of the rolls 1 and the raised lift rolls 2. The first turning roll 1 of the forward stretching machine then transports the rod 18 into the threading channel 61. The threading apparatus carries the film web over the rotating stationary rolls 1.

For safety reasons, the length of flexible rod 18 is more than twice the distance between two neighboring rolls. If the distance between the first stationary roll 1 and the first raised roll 2 is equal to y, then the length of the rod 18 in general is 2y plus 100 to 200 mm. If flexible rod 18 is gripped by three rolls at the same time as it is transported through the threading channel 61, as the case in FIG. 4a for the rod 18 indicated by a dotted line, then the rod exerts the greatest tensile force on the film web, since the static friction increases drastically as a result of the bending of flexible rod 18 between the rolls. This bending occurs due to the fact that, as described at the beginning, the lift height of the lift rolls 2 is somewhat smaller than the roll diameter of the lift rolls 2 or the stationary rolls 1. If, for example, a lift height is selected which is only 2 mm smaller than the roll diameter, the desired bending of flexible rod 18 occurs; this is shown in FIG. 4a, somewhat enlarged.

The threading apparatus is removed at the outlet of the forward stretching machine 23, either by hand or in a box (not illustrated) depending upon its speed. The film web can then be released from the clamp component in the above-described manner and the threading apparatus reinstalled at the inlet of the forward stretching machine 23. After the film is threaded through the forward stretching machine 23, the raised lift rolls 2 are lowered into their normal operating position and film production is continued.

FIGS. 5a and 5c each illustrate alternative embodiments of clamp component 25, each of which is suitable for the thicker film mentioned initially and is connected to the plastic tube of the rod 18 (not shown). The clamp component 25 depicted in FIG. 5a and FIG. 5d comprises an angular clamp element 34, one branch of which is formed by the curved section 36, while the other branch 39 is straight. The curved section 36 is movable around an axis 57 in a recess 35 of the base section 40 of the clamp component 25. A compression spring 38 is installed in a drilled hole in the base section 40; this spring is adjacent to the curved section 36 and thereby exerts a torque on the clamp element 34 in such a way that the underside of the branch 39 of the clamp element 34 is pressed against the base section 40. The underside of the branch 39 is equipped with mandrels 37 in order to hold the film firmly. To insert films, the clamp element 34 is raised and the film is inserted. The clamp element is then lowered again and held in the closed position by the compression spring 38. The mandrels hold the film while the clamp component 25, which is attached to the tube, is carried through the threading sequence.

Another embodiment of the clamp component 25 is illustrated by FIGS. 5b and 5e. The upper half of this clamp component contains a vertical slot 41, as the side view of the cylindrical clamp component 25 shows. A flat bar 42 is installed in the slot 1; this bar has an angled recess 43, into which two stationary pins 44 protrude. The base of the slot 41 is knurled, in order to securely hold the inserted film. One end of a compression spring 45 lies against the back side 46 of the flat bar 42; the other end lies against the back side 47 of the slot 41. The underside of the flat bar 42, together with the knurled base of the slot 41, forms an insertion slit for the film web. In order to hold the film web firmly, the flat bar 42 is pressed against the elastic force of the spring 45 and pushed upward along the inclined plane which is described by the plane of intersection of the two pins 44. As a result of this, the insertion slit between the flat bar 42 and the base surface of the slot 41 is opened wide enough for the film web to be inserted without difficulty. The directions that the flat bar 42 is displaced along the inclined plane by the two pins 44 is indicated by the arrows. If the flat bar 42 is released, then the compression spring 45 presses it down onto the inclined plane, so that the underside of the flat bar 42 presses the inserted film against the knurling on the base of the slot 41 and holds it. To release the film web it is only necessary to open the flat bar 42 against the elastic force of the compression spring 45.

In the schematic view of yet another embodiment of clamp component 25, shown in FIGS. 5c and 5f, a slit 48 is shown; this slit expands conically toward the toward the front side of the clamp component 25. Above insertion slit 48, in a recess of the clamp component 25, a movable cam 49 is installed off-center and opposite to the direction in which the clamp component 25 passes through the threading channel, when it and the plastic tube are attached to flexible rod 18. Below insertion slit 48, a roller 50 is movably installed in a recess of the clamp component 25, in the direction opposite to the threading direction. The roller 50 nd the cam 49 clamp the film inserted between them and hold it while the plastic tube attached to the clamp component is transported through the threading system. The automatic clamping of the film is released when the film is pushed into insertion slit 48, at which time the cam 49 moves upward on its axis and the automatic clamping between the cam and the roller is released, so that the film can be drawn out of the slit 48.

Figures 6A, 6B, 6C, 6D:
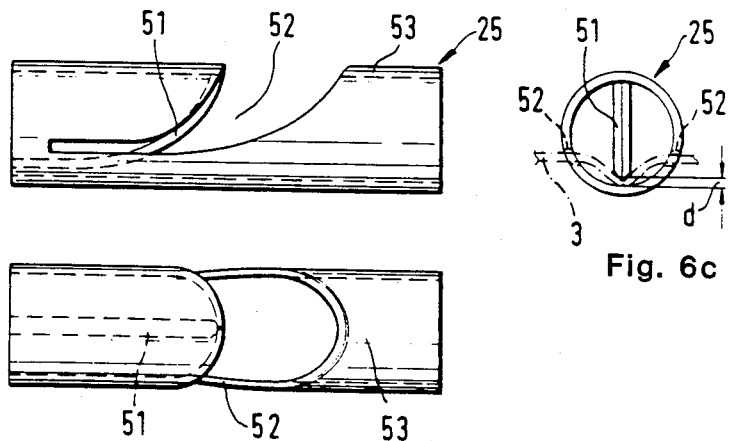
FIGS. 6a and 6b are schematic drawings of clamp components of the film threading apparatus according to the invention, suitable for relatively thin films.
FIGS. 6c and 6d are end views of the clamp components depicted in FIGS. 6a and 6b, respectively.

FIGS. 6a and 6b show other forms of clamp component 25 which are particularly suited for thinner films, as mentioned above. As can be seen in FIG. 6a and 6c, the clamp component 25 comprises a tube with a stationary, centrally located, sword bar 51, whose tip has a distance d from the inside wall of the tube. In the center of the tube, symmetrical with both sides of the sword bar 51, are two bowed insertion slits 52, which narrow from the upper edge of the tube 53; the part of these slits which is parallel to the edge of the tube runs above the tip of the sword bar 51. The film web 3 is conducted through the tube edge and around the tip of the sword bar 51 by the two insertion slits 52, 52. This results in an automatic clamping of the film web between the tip of the sword bar 51 and the place on the inside of the tube wall opposite the tip of the sword bar.

In the form illustrated in FIG. 6b and 6d, the clamp component is a tube having a centrally located, movable sword bar 58, which is movably attached near its upper end, opposite the bar tip. A compression spring 54 lies against the upper side of the curved sword bar 58 and presses it down. On each side of the sword bar 58 there is a curved insertion slit 55 in the tube, which slits become narrower from the upper tube edge 56 toward the end part which is parallel to the edge of the tube. The film web is conducted through the insertion slit 55 in the tube wall and around the tip of the movable sword bar 58 in a manner similar to the clamp component 25 in FIG. 6a. Furthermore, the tip of the spring-loaded sword bar 58 presses the film web against the inside of the tube wall. This embodiment is especially suitable for very thin films, having gauges of 30 μm or less.

We claim:

1. An improved forward stretching machine for the manufacture of oriented thermoplastic films comprising a plurality of individually driven, rotably mounted rolls in cooperating relationship, such that each alternate roll is a stationary roll and every other roll is a lift roll capable of being raised a distance slightly less than the diameter of a cylindrical film threading apparatus, with the proviso that each stationary and lift roll has a groove located on an intake plate of the roll adapted to receive said cylindrical film threading apparatus, such that the grooves of adjacent stationary and raised lift rolls form a channel through which said cylindrical film threading apparatus can pass when the lift rolls are in the raised position, said film threading apparatus being flexible and having a length more than twice the distance between two neighboring rolls so that it is gripped by three rolls and bent between said rolls at the same time as it is transported through said channel, said forward stretching machine further comprising means for inserting said cylindrical film threading apparatus into said channel formed by the stationary and raised lift rolls of the forward stretching machine.

2. The forward stretching machine of claim 1 wherein said plurality of stationary and lift rolls are each equipped with intake plates on both sides of the roll.

3. The improved forward stretching machine of claim 1, herein said means for inserting said cylindrical film threading apparatus into said channel formed by the stationary and raised lift rolls of the forward stretching machine comprises an insertion mechanism having upper and lower pairs of guide bearings, between which film threading apparatus is inserted, with a support bar being pivotable on a stationary axis for said film threading apparatus, said support bar being connected to one of said lower pairs of the guide bearings in the film threading direction, while the front and back ends of the support bar are connected to means to pivot the support bar.

4. The improved forward stretching machine of claim 3, wherein the front end of said support bar in the insertion direction is connected to a tension spring which raises the front end of said support bar and that the back end is connected by a linkage rod to a foot pedal for swiveling said support bar by pressing said foot pedal against the action of said tension spring into a horizontal position.

* * * * *